United States Patent [19]

Baker

[11] Patent Number: 4,917,732
[45] Date of Patent: Apr. 17, 1990

[54] FLYASH TREATMENT

[75] Inventor: Daniel C. Baker, Houston, Tex.

[73] Assignee: Shell Oil Company, Houston, Tex.

[21] Appl. No.: 263,962

[22] Filed: Oct. 25, 1988

Related U.S. Application Data

[63] Continuation of Ser. No. 944,908, Dec. 22, 1986, abandoned.

[51] Int. Cl.$^4$ ............................................. C04B 7/14
[52] U.S. Cl. .................................. 106/85; 106/117; 106/DIG. 1
[58] Field of Search .................... 106/85, 117, DIG. 1

[56]      References Cited
       U.S. PATENT DOCUMENTS

| | | | |
|---|---|---|---|
| Re. 31,118 | 1/1983 | Slater | 106/89 |
| 3,975,277 | 8/1976 | Pierrou | 501/141 |
| 4,040,853 | 8/1977 | Jones | 106/97 |
| 4,105,463 | 8/1978 | Angelbeck | 106/120 |
| 4,144,078 | 3/1979 | Colwell | 106/97 |
| 4,188,230 | 2/1980 | Gillott | 501/140 |
| 4,210,457 | 7/1980 | Dodson | 106/DIG. 1 |
| 4,230,460 | 10/1980 | Maust | 44/16 C |
| 4,265,671 | 5/1981 | Kroyer | 106/103 |
| 4,318,744 | 3/1982 | Dodson | 106/90 |
| 4,464,200 | 8/1984 | Duval | 106/90 |
| 4,509,985 | 4/1985 | Davidovits | 106/84 |
| 4,642,137 | 2/1987 | Heitzmann et al. | 106/89 |

FOREIGN PATENT DOCUMENTS

| | | | |
|---|---|---|---|
| 1228984 | 7/1963 | Fed. Rep. of Germany | 106/117 |
| 2489299 | 3/1982 | France | 106/117 |
| 4745925 | 10/1964 | Japan | 106/117 |
| 8176976 | 9/1985 | Japan | 106/117 |

OTHER PUBLICATIONS

*Concrete Manual*, 8th ed., U.S. Dept. of Interior, 1981 p. 439–441.
Hawley, *The Condensed Chemical Dictionary*, 10th Ed., Van Nostrand Reinhold Co., Inc., N.Y. (1981) p. 927.
Kong, et al., *Handbook of Structural Concrete*, McGraw Hill Book Co., N.Y. (1983), Chapter 9, p. 23.
Bye, G. *Portland Cement*, Pergamon Press, Oxford (1983) p. 134–135 Taylor, *Concrete Technology and Practice*, Elsevier Pub. Co., N.Y. (1965), p. 20.
Ramachandran, V. *Concrete Admixture Handbook*, Noyes Pub., Park Ridge, N.J. (1984), p. 170.

*Primary Examiner*—Brian E. Hearn
*Assistant Examiner*—Andrew Griffis
*Attorney, Agent, or Firm*—Albert J. Adamcik

[57]           ABSTRACT

A process for production of a flyash-slag composite is described in which, in one embodiment, slag particles are tumbled with an aqueous suspension of finely divided clay, flyash and a cementitious material are added, and the mixture is tumbled to produce the desired composite.

6 Claims, No Drawings

FLYASH TREATMENT

This is a continuation of application Ser. No. 944,908 filed Dec. 22, 1986 now abandoned.

BACKGROUND OF THE INVENTION

Partial combustion or gasification of coal involves reacting the coal at elevated temperatures and possibly elevated pressures with a limited volume of oxygen, the reaction preferably being carried out in the presence of additional agents such as steam, carbon dioxide, or various other materials. Gasification of coal produces a gas, known as synthesis gas, that contains mostly carbon monoxide and hydrogen. Also produced are various liquid and solid materials, such as small particles of ash and carbon commonly known as flyash. This flyash, because it is derived from a "reducing" atmosphere, tends to be different in composition and properties from flyash normally associated with combustion boilers where a fully oxidizing atmosphere is utilized. For example, the flyash from processes for partial combustion of coal may contain elemental iron, sulfides, and deposited carbon, components not normally associated with boiler flyash. In general, the flyash entrained with the gas in partial combustion processes is usually removed from the raw synthesis gas by a combination of cyclones or separators, or a water scrubbing system employing washer coolers, venturi scrubbers, or filters or electrostatic precipitators, or combinations of these systems.

The flyash removed from the synthesis gas may have undesirable properties insofar as its ultimate disposal is concerned. For example, it may be light, friable, dusty and difficult to compact. Because it may contain unsuitable species such as arsenic, selenium, and sulfides, it must be handled with care, and, if it is to be disposed of as land fill, must be in a form which does not release such materials readily to the environment.

In at least one process for the gasification of coal to produce synthesis gas, significant quantities of unreacted impurity matter, variously referred to as char and/or slag, are also produced during combustion or oxidation in the gasification zone. This matter generally segregates in the bottom of the gasification zone, normally in a water bath. Upon separation of the char and/or slag (collectively referred to herein as slag) from the gasification zone, a further solids issue exists, since these materials have undesirable properties which limit options for their utilization or disposal. For example, the slag, as more fully defined in U.S. Ser. No. 813,735, entitled Char Process, filed Dec. 27, 1985, incorporated by reference, may be disposed of as described therein. That solution, however, involves a significant capital cost. The invention addresses the problem of flyash and slag treatment, accomplishing the treatment and providing a novel composition having properties indicating utilities of greater value than mere landfill.

SUMMARY OF THE INVENTION

Accordingly, the invention relates, in one embodiment, to a process whereby both flyash and slag are combined in a novel fashion to produce a composite which may be used in road construction. More particularly, the invention relates, in one scheme, to a process in which slag particles are tumbled with an aqueous suspension of finely divided clay, the ratio of slag to said clay, by weight, being from about 15 parts to about 40 parts slag per part of clay, and a mixture comprising aggregates of slag, clay, and suspension is formed. Flyash is added to the mixture while tumbling the mixture, the flyash being added in a ratio of from about one part flyash to about 5 parts flyash per part of slag, by weight, and a flyash-aggregate mixture is formed. A cementitious material is then added to the flyash aggregate mixture while tumbling the flyash-aggregate mixture, the ratio of cementitious material added to flyash being from about 0.1 part to about 0.3 part cementitious material per part of flyash, by weight, and a solid composite is produced which may be used as a road base material. Water is present in the suspension, or is added during tumbling, in an amount sufficient to provide a ratio of water to the total solids tumbled (slag, clay, and flyash) of from about 0.2 to about 0.5, preferably from about 0.2 to about 0.4. In an alternate embodiment, the cementitious material may be added to the mixture along with or simultaneously with the flyash.

In another embodiment, the invention relates to a particulate flyash-slag composite comprising discrete particles of slag dispersed in a solid mixture formed by tumbling, under aggregation conditions, slag, and aqueous suspension of a finely divided clay, flyash, and a cementitious material, the slag being present in an amount of from about 15 percent to about 40 percent, the flyash being present in an amount of from about 50 percent to about 75 percent, the clay being present in an amount of from about 0.5 percent to about 1 percent, and the cementitious material being present in an amount of from about 10 percent to about 30 percent, all by weight, based on the finished dry weight of the composite. As initially prepared, the finished composite will normally contain from about 20 percent to about 50 percent water, based on the weight of the total solids and water, both free and reacted water being taken into account. As used herein, the term "flyash" generally refers to lighter material removed with product synthesis gas and separated therefrom after the synthesis gas is removed from the gasification zone. "Slag", by comparison, will generally be a heavier, more vitreous material commonly, as indicated, separating from the gas by gravity in or near the gasification zone, and being collected in the lower portion of the gasification zone. As those skilled in the art will recognize, a significant distinction between "flyash" and "slag" is the density, the latter being the denser material.

As used herein, the term "cementitious material" refers to compositions comprising alumina, silica, lime, iron oxide, and magnesia burned together in a kiln and finely pulverized, which, when mixed with water to form a plastic mass hardens by chemical combination and by gelation and crystallization. Suitable examples of such material include, but are not limited to, portland cement, alumina cement, and natural cement. In the process and composition of the invention, lime (CaO) may substitute for a portion of the cementitious material, e.g., from about 25 percent by weight to about 50 percent by weight of lime per part of cementitious material. The term "water" is generally taken to mean any source of water, including pure water and "impure" water from a variety of sources, and thus will include water containing minor impurities, both liquid, solid, and gaseous. For example, the water employed may be a concentrated waste slurry stream, as described in copending application Ser. No. 944907, entitled Flyslag Treatment, by Potter and Baker, filed even dated herewith, and may include, but is not limited to, effluent streams, waste streams, blowdown, etc. Those skilled in the art will recognize that the only significant limitation is that any extraneous components of the "water" do not interfere to any substantial extent with the aggregation or formation of the composites or desired properties of such composites described herein, or do not pose significant environmental problems themselves.

Any suitable finely divided clay may be used in this invention. The term "clay" is more definitive a type of or class of properties, rather than of particular materials, as employed and utilized in the Encyclopedia of Chemical Technology, third edition, Volume 6, 1979, pages 190 through 209. Accordingly, as used herein, the term "clay" is employed as used therein, and refers to, but is not limited to, mineral matter having sufficient plasticity so that, when wetted, deformation occurs by application of relatively slight pressure and the deformed shape is retained after release of the pressure, the matter being composed of extremely fine crystals or particles, often colloidal in size and usually platy in shape, of clay minerals with or without rock or mineral particles, the clay minerals, mostly phyllosilicates, being hydrous silicates of Al, Mg, Fe, and other less abundant elements. Those skilled in the art will recognize that many materials will be suitable as a "clay" type material for use in the invention. For example, those finely divided clays referred to as expandable three layered clays are most suitable for the invention. Included in such clays are bentonite, montmorillonite, chlorite and vermiculite. Clays not as desirable but still useable in the invention include kaolinite, muscovite, and illite.

The clay particles will normally have an average particle size of from about $10\mu$ to about $500\mu$, preferably from about $25\mu$ to about $100\mu$. Slag particles will be utilized having an average particle size of from about 0.1 mm to about 15 mm preferably from about 0.5 mm to about 5 mm, while flyash particles will be used having an average particle size of from about $1\mu$ to about $50\mu$, preferably from about $1\mu$ to about $20\mu$. The cementitious material will be, of course, in finely divided form.

Pressures and temperatures employed in the process of the invention are not generally critical, although those skilled in the art will recognize that the water employed should not freeze or boil. Accordingly, the materials are simply brought together while tumbling at a rate sufficient to provide good rotation and agglomeration under suitable pressure and temperature conditions normally observed in the workplace, collectively referred to herein as conditions effective to provide aggregation. The materials may be tumbled until suitable aggregate sizes are reached, normally 1 mm to 40 mm preferably 10 mm to 20 mm.

The following experiments were conducted.

I

Pulverized dry slag (91.0 g.) from the side slag discharge of a coal gasification process, and having an average particle size of about 1 mm, and 50 milliliters of a suspension of bentonite clay (formed by suspending approximately 7.0 g. of clay in 50 mls. of water) are charged to an inclined rotating vessel. Pressure is atmospheric, and temperature is ambient, about 25° C. While maintaining the rotation of the vessel, approximately 392 g. of flyash derived from a coal gasification process, and having an average particle size of $8\mu$, along with 30.0 g. of portland cement and 9.0 g. of lime, are fed into the vessel in discrete charges. As the aggregates form and increase in size, water is taken up by the solids, and water is added to the vessel. The composites generally have an core comprising discrete particles of slag, with each particle having a surrounding shell of flyash, cement and clay mixture. The composites have the following composition (rounded to whole numbers):

| Material | Percent by Weight Based on Dry Composite |
| --- | --- |
| Slag | 17 |
| Flyash | 75 |
| Cement and lime | 7 |
| Bentonite clay | 1 |
| Initial Water | 25 |
| Final Free Moisture, after normal drying | 6 |

II

The procedure of experiment I was repeated with slag and flyash taken from a different gasification operation, except that 176.0 g. of pulverized dry slag (1 mm in size), 5 grams of bentonite clay in 100 milliliters aqueous suspension, 238.0 g. of flyash ($45\mu$ in size), and 57 g. of portland cement (no lime) are utilized. The composites have the following composition (rounded to whole numbers):

| Material | Percent by Weight Based on Dry Composite |
| --- | --- |
| Slag | 37 |
| Flyash | 50 |
| Cement | 12 |
| Bentonite clay | 1 |
| Initial water | 50 |
| Final Free Moisture, after normal drying | 3 |

While the invention has been illustrated with particular apparatus, those skilled in the art will appreciate that other equivalent or analogous units may be employed. The type of equipment employed in carrying out the process of the invention may readily be selected by those skilled in the art. For example, the slag and the clay suspension may be charged to a rotating inclined tumbling mill or device, the cementitious material and flyash being added through lines which distribute these materials down the length of the mill to gradually increase the size of the aggregates by the time they exit the mill. A screen may be provided at the outlet of the mill for returning undersized particles to an "upper" portion of the rotating mill.

What is claimed is:

1. A process for producing a flyash-slag composite comprising discrete particles of slag dispersed in a solid mixture comprising
    (a) tumbling slag particles with an aqueous suspension of finely divided clay, under conditions effective to provide aggregation, the ratio of slag to said clay, by weight, being from about 15 parts to about 40 parts slag per part of clay, and forming a mixture comprising aggregates of slag and clay in said suspension;
    (b) adding flyash derived from the gasification of coal to said mixture while tumbling said mixture under said conditions, said flyash particles being added in a ratio of from about one part to about 5 parts flyash per part of slag, by weight, and forming a flyash-aggregate mixture;

(c) adding a finely divided cementitious material to said flyash-aggregate mixture while tumbling said flyash aggregate mixture, the ratio of cementitious material to flyash being from about 0.1 part to about 0.3 part cementitious material per part of flyash, by weight, and producing a flyash composite, the amount of water present in the suspension or added during tumbling, by weight, being sufficient to produce a ratio of water to the total solids tumbled of from about 0.1 to about 0.5.

2. A process for producing a flyash composite comprising discrete particles of slag dispersed in a solid mixture comprising (a) tumbling slag particles with an aqueous suspension of finely divided clay, under conditions effective to provide aggregation, the ratio of slag to said clay, by weight, being from about 15 parts to 40 parts slag per part of clay, and forming a mixture comprising aggregates of slag and clay in said suspension;

(b) adding flyash derived from the gasification of coal and a cementitious material to said mixture, while tumbling said mixture under said conditions, said flyash being added in a ratio of from about one part to about 5 parts flyash being from about 0.1 part to about 0.3 part cementitious material per part of flyash, and producing a flyash composite, the amount of water present in the suspension or added during tumbling, by weight, being sufficient to produce a ratio of water to the total solids tumbled of from about 0.2 to about 0.5.

3. A flyash-slag composite comprising discrete particles of slag dispersed in a solid mixture formed by tumbling, under aggregation conditions, slag, and aqueous suspension of a finely divided clay, flyash derived from the gasification of coal, and a cementitious material, the slag being present in an amount of from about fifteen percent to about forty percent, the flyash being present in an amount of from about fifty percent to about seventy-five percent, the clay being present in an amount of from one-half of one percent to about one percent, and the cementitious material being present in an amount of from about ten percent to about thirty percent, all by weight, based on the finished dry weight of the composite.

4. The process of claim 1 wherein the clay is bentonite clay.

5. The process of claim 2 wherein the clay is bentonite clay.

6. The composition of claim 3 wherein the clay is bentonite clay.

* * * * *